Dec. 23, 1924.

J. A. GABRIEL 1,520,233

LIQUID AND GAS REGULATING VALVE

Filed March 28, 1921

Inventor
J. A. Gabriel
By E. F. Dunstan,
his Attorney

Patented Dec. 23, 1924.

1,520,233

UNITED STATES PATENT OFFICE.

JOSEPH A. GABRIEL, OF CLEVELAND, OHIO.

LIQUID AND GAS REGULATING VALVE.

Application filed March 28, 1921. Serial No. 456,290.

*To all whom it may concern:*

Be it known that I, JOSEPH A. GABRIEL, a citizen of the United States, residing at Cleveland, in the county of Cuyahoga and State of Ohio, have invented certain new and useful Improvements in Liquid and Gas Regulating Valves, of which the following is a specification.

This invention relates to liquid and gas regulating valves, and has for its main object to provide a valve for regulating the quantities of liquid and gas admitted therethrough in proper proportion one to the other so as to give the desired combination and produce the most efficient results for liquid fuel burners or other purposes.

Another object of the invention is to provide a device of said character consisting of two three-way valves and providing means whereby each valve may be adjusted independently or the adjusting of one valve will determine the adjustment of the other.

A further object of this invention is to provide a valve of said character which may be set to full openings for blowing out to clean thoroughly, without the necessity of changing the adjustments, and then reset to original position thereby leaving the valve adjusted as before.

With the above and other objects in view as will be readily understood, the invention will be hereinafter fully described as illustrated in the accompanying drawings, and the novel feature thereof will be particularly pointed out in the appended claims.

In the drawings similar characters of reference are used to designate corresponding parts.

Figure 2:
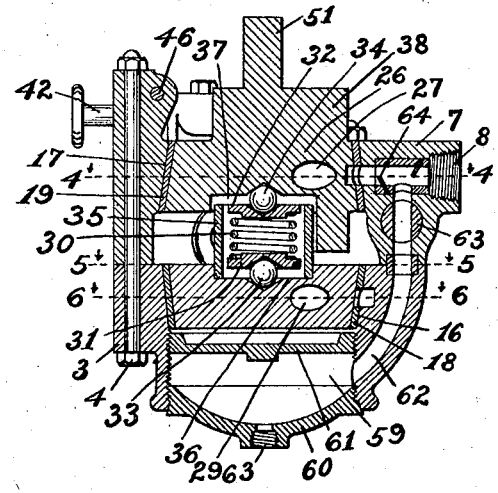
Fig. 2 is a sectional view taken on line 2—2 of Fig. 3.
Figure 3:
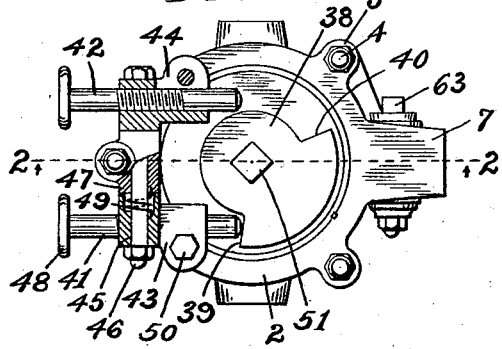
Figure 4:
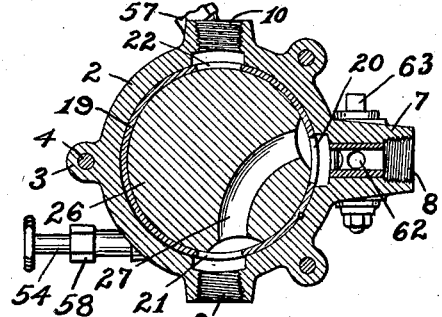
Figure 5:
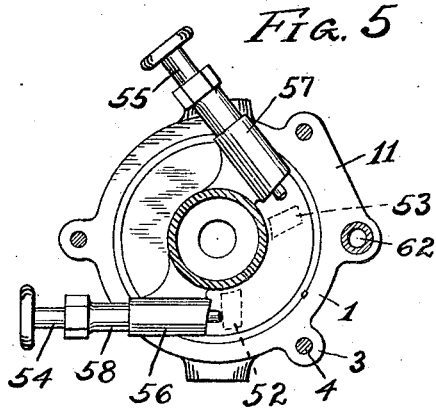
Figure 6:
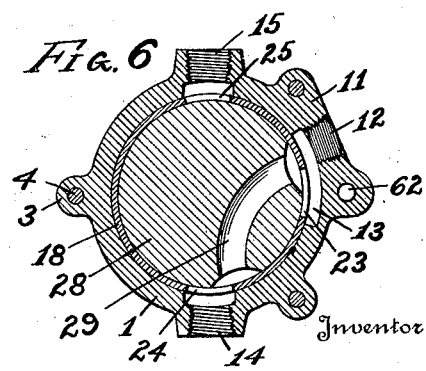

Fig. 3 is a plan view with certain parts broken away to better show the construction, Fig. 4 is a cross sectional view taken on line 4—4 of Fig. 2, Fig. 5 is a plan and cross sectional view taken on line 5—5 of Fig. 2, and Fig. 6 is a cross sectional view taken on line 6—6 of Fig. 2.

Referring to the drawings, 1 represents a lower casing and 2 an upper casing having lugs at 3, through which pass bolts 4 for connecting said casings together to form the body of the valve. Said lugs of the upper casing depend below its under face 5 thereby leaving a space between the same and the upper face 6 of the lower casing. Formed integrally with the upper casing 2 is a laterally extending boss 7 having an inlet opening 8 for oil or other fluid. Outlet openings 9 and 10 are provided in opposite bosses of the upper casing 2, which openings are at right angles to the inlet opening 8 and in the same horizontal plain. The lower casing 1 is enlarged at 11 and provided with an intake opening 12 for steam or other gas, and from said opening extends an opening 13 leading to the interior of the casing. At opposite sides of the lower casing, in the same plain as the opening 13 and at right angles thereto, are discharge openings 14 and 15.

The lower casing 1 is provided with an inwardly tapering bore 16 extending from its upper face 6, and the upper casing 2 is provided with a similar bore 17 but having the larger opening of the bore at the under face 5 of the casing. Sleeves 18 and 19 are keyed in the bores 16 and 17 respectively. The sleeve 19 is provided with a suitable opening 20 opposite the opening 8 and with suitable openings 21 and 22 opposite the openings 9 and 10 of the upper casing and the sleeve 18 is provided with an opening 23 opposite the opening 13 and with openings 24 and 25 opposite the openings 14 and 15 of the lower casing. In the sleeve 19 of the upper casing is rotatably mounted a plug 26 having a curved conduit 27, which is adapted to connect the inlet opening 20 with either of the outlet openings 21 or 22. A plug 28 is rotatably mounted in the sleeve 18 of the lower casing and is provided with a curved conduit 29, which is adapted to establish communication between the intake opening 23 and either of the discharge openings 24 or 25. The plugs 26 and 28 are forced into their respective sleeves 19 and 18 by means of a coiled spring 30, which is arranged between a pair of plates 31 and 32, and between said plates and said plugs in suitable recesses provided therein are balls 33 and 34 for centralizing the spring pressure upon said plugs. Said coiled spring is enclosed in a tube 35, which is fixed into a depression 36 of the lower plug 28 and extends into a recess 37 of the upper plug 26.

The adjustment of the plugs 26 and 28 either separately or relatively to each other, and the turning of the same to their full openings for the purpose of being blown out, is accomplished by means of the constructions now to be described. Forming a part of and projecting above the plug 26 is a boss 38, which is cut out to leave lateral shoulders 39 and 40. Adjusting screws 41 and 42 are supported by members 43 and 44, which are pivoted as at 45 to a bolt 46 fixed in a portion 47 of the upper casing 2, and said adjusting screws are adapted to engage or be engaged by the shoulders 39 and 40. Said adjusting screws may be conveniently turned by means of hand wheels at the outer ends thereof as indicated by 48, and the screws may be marked in any suitable manner to indicate their position when set. Each of the members 43 and 44 is forced to its normal position by means of a coiled spring as 49 having one end attached to the member and its other end to the portion 47. A cap screw as at 50 locks each of the adjusting screws 41 and 42 against movement in the members 43 and 44. For convenience in turning the upper plug 26, a wrench may be applied to a square boss 51 projecting from the top thereof. Depending from the under face 5 of the upper plug 26, is a pair of lugs 52 and 53, which is adapted to engage and be engaged by a pair of adjusting screws 54 and 55 mounted in bosses 56 and 57 carried by the upper face 6 of the lower plug 28. Lock nuts as 58 are adapted to hold said adjusting screws in a set position. Any suitable means of marking the adjusting screws 54 and 55 to indicate their positions when set may be employed. The shoulders 39 and 40, and the lugs 52 and 53 are suitably positioned with relation to the conduits 27 and 29 of the plugs and their corresponding openings in the upper and lower casings to allow for the proper adjustments of said plugs.

Leading from the inlet opening 8 to a chamber 59 below the plug 28 and between removable covers 60 and 61 in the bottom end of the lower casing 1 is a passage 62, and in this passage is a shut-off valve 63. In the inlet opening 8 are baffle plates 64 for preventing particles of foreign matter entering the conduit 27, and causing them to fall into the chamber 59 by way of the passage 62. An outlet opening 63 is provided in the bottom of the cover 60.

Figure 1:
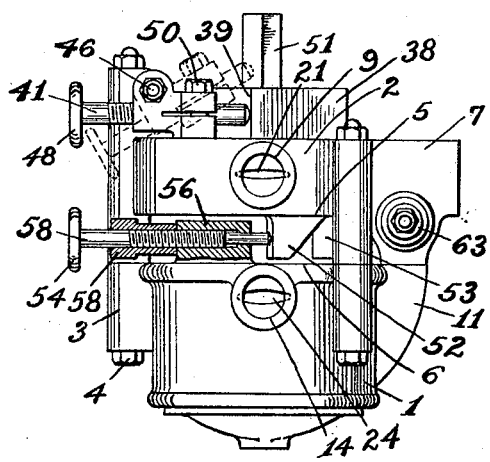
Figure 1 is a side view of a valve constructed in accordance with my invention.

Operation: In practice the oil or other fluid is admitted at the inlet opening 8 of the upper casing and discharged at 9 or 10 depending upon the position of the conduit 27 of the upper plug 26, and steam or other gas is admitted at 12 and discharged at 14 or 15 of the lower casing. The plugs 26 and 28 may be operated to their complete open positions or to any part thereof, or may shut-off the openings thereto in the manner well known. After the plugs 26 and 28 have been set either one of the adjusting screws 41 or 42 engages the shoulder 39 or 40, and either of the adjusting screws 54 or 55 engages the lugs 52 or 53. If it is desired to turn the plugs 26 and 28 to their fully open positions, the member 43 or 44 carrying the adjusting screw 41 or 42 engaging the shoulder 39 or 40 is tilted as shown in dotted lines Fig. 1, and the upper plug 26 may then be turned so as to give clear passage for blowing out the same. The turning of the upper plug 26 will also turn the lower plug 28, as its lug 52 or 53 engages one of the adjusting screws 54 or 55, to give full opening. Should the adjusting screws 54 or 55 be so set as not to permit full opening, said adjusting screws may be withdrawn for this purpose and then returned as indicated by the markings thereon. When the plugs have been blown out the upper plug 26 may be turned to approximately its former position, and the tilted member carrying the adjusting screw returned to its normal position. The plug 26 is then turned until the same shoulder as before engages said adjusting screw, thereby setting the plug to its original position. Upon turning the plug 26, its lug 52 or 53 will engage the same adjusting screw 54 or 55 as before thereby also setting the lower plug 28 to its original position.

Having fully described my invention, what I claim is:

1. In a regulating valve, the combination of a casing, the casing having upper and lower inlet and outlet openings, an upper plug and lower plug rotatably mounted in the casing, the upper plug and the lower plug having conduits adapted to establish communication between said upper and lower inlet and outlet openings respectively, and adjustable means for causing the rotation of one plug when the other plug is moving, substantially as described.

2. In a regulating valve, the combination of a casing, the casing having upper and lower inlet and outlet openings, an upper plug and lower plug rotatably mounted in the casing, the upper plug and the lower plug having conduits adapted to establish communication between said upper and lower inlet and outlet openings respectively, a lug carried by one of the plugs, and adjustable means carried by the other plug adapted to be engaged by the lug when the first plug is rotated to cause movement of the latter plug, substantially as described.

3. In a regulating valve, the combination of a casing, the casing having upper and lower inlet and outlet openings, an upper plug and lower plug rotatably mounted in the casing, the upper plug and the lower plug having conduits adapted to establish communication between said upper and lower inlet and outlet openings respectively, a lug carried by one of the plugs, an adjusting screw carried by the other plug adapted to be engaged by said lug when the first plug is rotated to cause movement of the latter plug, substantially as described.

4. In a regulating valve, the combination of a casing, the casing having upper and lower inlet and outlet openings, an upper plug and lower plug rotatably mounted in the casing, the upper plug and the lower plug having conduits adapted to establish communication between said upper and lower inlet and outlet openings respectively, a lug carried by one of the plugs, an adjusting screw carried by the other plug adapted to be engaged by said lug when the first plug is rotated to cause movement of the latter plug, and means for locking the adjusting screw against movement with relation to the plug carrying said adjusting screw, substantially as described.

5. In a regulating valve, the combination of a casing, the casing having upper and lower inlet and outlet openings, an upper plug and lower plug rotatably mounted in the casing, the upper plug and the lower plug having conduits adapted to establish communication between said upper and lower inlet and outlet openings respectively, a plurality of lugs carried by one of the plugs, and an adjusting screw carried by the other plug adapted to be engaged by said lugs when the first plug is rotated to cause movement of the latter plug, substantially as described.

6. In a regulating valve, the combination of a casing, the casing having lower and upper tapering bores, the casing having lower and upper inlet and outlet openings and a lower plug and an upper plug rotatably mounted in said lower and upper bores of the casing respectively, spring means tending to force the lower plug and the upper plug into their respective bores, the lower plug and the upper plug having conduits adapted to establish communication between said lower inlet and outlet openings and said upper inlet and outlet openings respectively, and adjustable means for causing the rotation of one plug when the other plug is turned, substantially as described.

7. In a regulating valve, the combination of a casing, the casing having upper and lower inlet and outlet openings, an upper plug and lower plug rotatably mounted in the casing, the upper plug and the lower plug having conduits adapted to establish communication between said upper and lower inlet and outlet openings respectively, means for causing the rotation of the lower plug when the upper plug is moving, an adjusting screw for limiting the rotation of the upper plug, the adjusting screw being carried by a member, and the member being pivoted to move at a right angle to the movement of said adjusting screw, substantially as described.

In testimony whereof I affix my signature.

JOSEPH A. GABRIEL.